United States Patent [19]
Nyström

[11] 3,897,036
[45] July 29, 1975

[54] VEHICLE CHAIR HAVING A RESILIENTLY SUPPORTED SEAT

[76] Inventor: Karl Gösta Nyström, Skeppargatan 13, Umea 902 52, Sweden

[22] Filed: Feb. 5, 1973

[21] Appl. No.: 329,951

Related U.S. Application Data

[63] Continuation of Ser. No. 86,256, Nov. 2, 1970, abandoned.

[30] Foreign Application Priority Data
  Oct. 31, 1969 Sweden............................. 14971/69
  Apr. 20, 1970 Sweden............................. 5425/70

[52] U.S. Cl................................ 248/399; 248/421
[51] Int. Cl............................................... B60n 1/02
[58] Field of Search .......... 248/399, 400, 401, 430, 248/421; 81/63

[56] References Cited
  UNITED STATES PATENTS
  1,639,078  8/1927  Coe......................................... 81/63
  2,936,818  5/1960  Harrington et al. ................ 248/399

FOREIGN PATENTS OR APPLICATIONS
  674,251    6/1952  United Kingdom................ 248/399
  873,978    8/1961  United Kingdom................ 248/399
  930,903    7/1963  United Kingdom................ 248/399
  1,015,030  8/1952  France.............................. 267/180

Primary Examiner—Marion Parsons, Jr.
Attorney, Agent, or Firm—Fred Philpitt

[57] ABSTRACT

A support for a vehicle seat comprising a spring biased linrage pivotally attached to upper and lower structure. The spring biasing means has winding pitch varying along the length of the spring and is adjustable by a ratchet in conjunction with a nut and threaded rod.

3 Claims, 9 Drawing Figures

VEHICLE CHAIR HAVING A RESILIENTLY SUPPORTED SEAT

This is a continuation of application Ser. No. 86,256, filed Nov. 2, 1970, now abandoned.

The present invention relates to a vehicle chair having a resiliently supported seat.

An object of the invention is to provide a vehicle chair of said type in which the spring forces counteracting downward movement of the seat can be varied so that the chair will offer the best possible comfort to an occupant.

Another object of the invention is to provide a vehicle chair of said type in which the spring means and cooperating members will occupy a small volume thereby permitting a compact design of the supporting structure.

Still another object of the invention is to provide a chair of the actual type in which the magnitude of the said spring forces can be adjusted in a simple manner, either manually or automatically to match the weight of the occupant.

A vehicle chair designed in accordance with the invention is primarily characterized by progressive spring means for counteracting downward movement of the seat.

The invention renders it possible to obtain a compact design of the spring device. In addition the magnitude of the vertical movements of the chair will be reduced. Furthermore, the invention makes it possible to design the chair so that the natural resonance frequency determined by the spring characteristics will assume a value below the critical region having a lower limit of about 2 Hz.

According to a preferred embodiment of the invention the progressive spring means are formed by at least one helical spring having a winding pitch varying along the length of the spring. Preferably, the pitch of said helical spring may have a maximum value at the middle portion of the spring and a minimum value at each end of the spring.

According to the invention the spring means may be arranged to act on a pivot arm coupled to the seat, the attack point of said spring means on the pivot arm being displaceable along the arm to permit and adjustment of the torque opposing downward movement of the seat. Advantageously, the spring means may be connected to the pivot arm by means of a non-rotatable nut mounted on a threaded bolt extending lengthwise of the pivot arm and arranged upon rotation thereof to cause an axial displacement of the nut. The invention also suggests that a toothed wheel may be mounted on said bolt to permit rotation of the bolt in any desired direction by means of a ratchet wrench cooperating with said toothed wheel.

Below the invention will be described in greater detail reference being hand to the accompanying drawings, in which.

Figure 1:
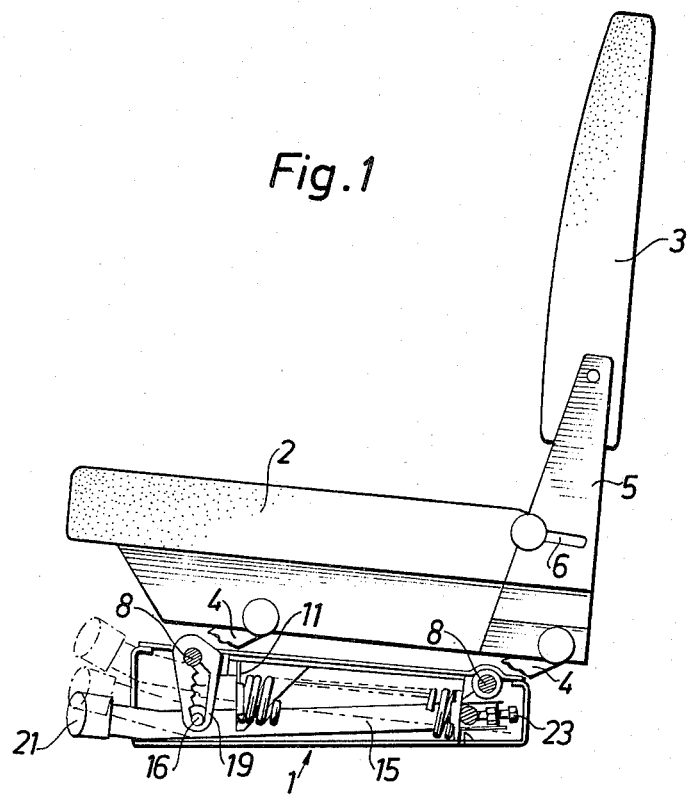
FIG. 1 is a side elevation, partly in section, of a vehicle chair according to a first embodiment of the invention.
Figure 2:
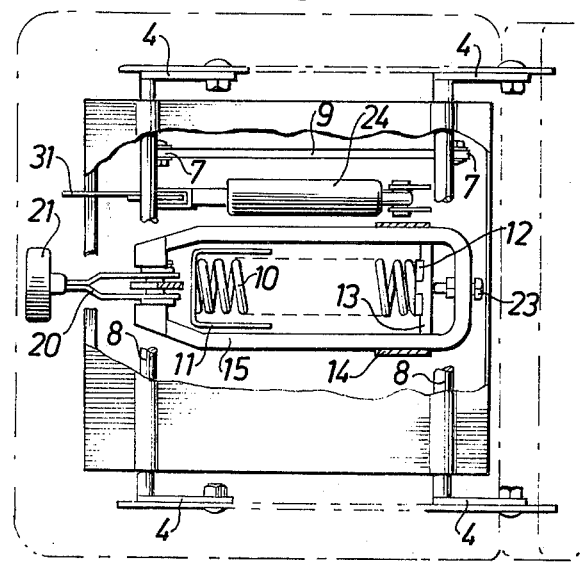
FIG. 2 is a plan view, partly in section, of the chair according to FIG. 1.
Figure 4:
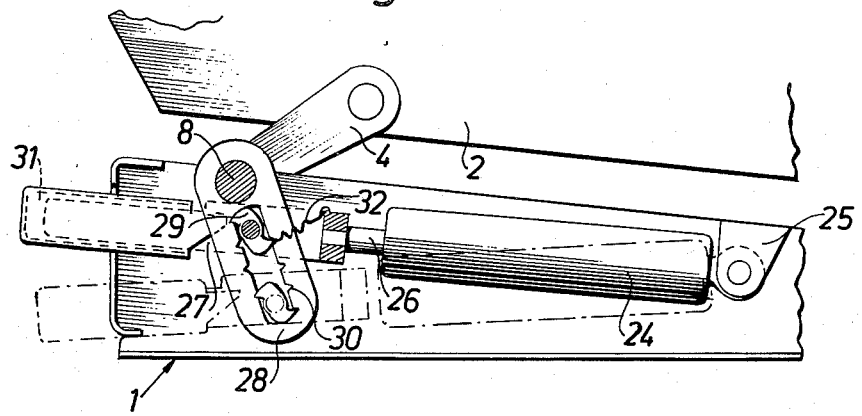
FIG. 4 is a partial section, on enlarged scale, showing adjustment means for the shock absorber of the chair.
Figure 3:
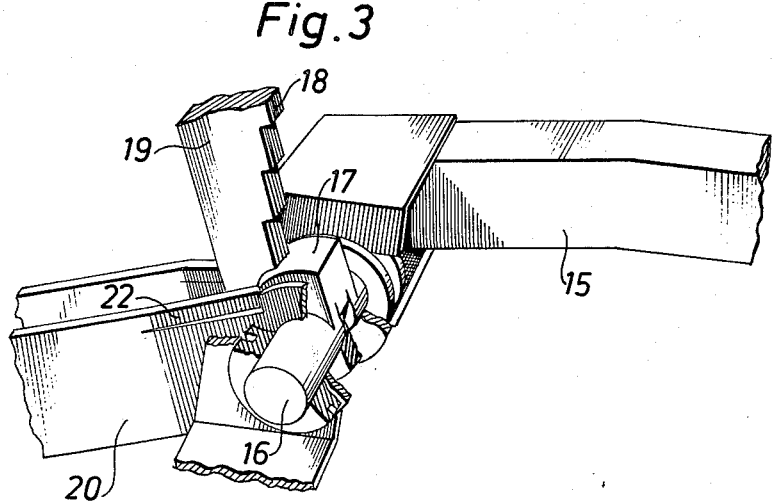
FIG. 3 is a partial view, on enlarged scale and in section, showing the design of means incorporated in the device for adjusting the magnitude of the spring forces.

Referring to FIGS. 1–4 the vehicle chair shown comprises a box type support structure 1 adapted to be mounted adjustable or in fixed position in a vehicle. Thus, the support structure may for instance be longitudinally displaceable or rotatably mounted in the vehicle. Reference numeral 2 denotes the seat of the chair while reference numeral 3 designates the back. The seat 2 is mounted in known manner on the support structure by means of four pivotal supporting arms 4 having their one ends pivotally connected to the support structure 1 and their other ends pivotally coupled with the seat 2. The back 3 is mounted on the seat 2 by means of a bracket 5. The inclination of the back 3 is adjustable by means of an operating arm 6. The arms 4 are in known manner arranged to form opposite links in a parallelogram mechanism which ensures that the seat 2 will always carry out a true parallel movement. In order to unload the joints between arms 4 and seat 2 said arms are coupled to another parallelogram mechanism comprising on the one hand two links 7 projecting downwards from transverse shafts 8 journalled in the support structure 1 and each connecting one pair of arms 4 and, on the other hand a longitudinally extending link 9 connecting the outer ends of links 7.

The chair has a spring device adapted to counteract downward movement of the seat. Said spring device comprises a helical compression spring 10 located within the box-shaped support structure 1 and having its one end resting against a bracket 11 secured to the upper wall of the support structure 1. The opposite end of spring 10 contacts a disc 12 bearing against a transverse shaft 13 journalled for displacement in the longitudinal direction of the support structure 1. For this purpose the ends of shaft 13 are received in elongated longitudinal openings in brackets 14 secured to the bottom wall of the support structure 1. A substantially U-shaped yoke 15 is pivotally mounted on shaft 13, the legs of said yoke having their free ends connected to each other by means of a transverse shaft 16. Said shaft 16 is formed as an eccentric shaft, and at its central portion it has a projecting stud 17 adapted to cooperate with locking teeth 18 on an arm 19 rigidly secured to the front shaft 8 to rotate in unison therewith. The locking teeth 18 are provided along one longitudinally extending edge of an elongated opening in arm 19. At its central portion shaft 16 has an operating arm 20 comprising two parallel legs of sheet metal having their free ends interconnected by means of an operating handle 21. The legs of arm 20 are provided with bent-in tabs 22 adapted to engage stud 17 to cause rotation of shaft 16 when it is desired to bring the locking stud 17 out of engagement with the teeth 18. Arm 20 can be spring biased towards its locking position.

As is apparent from the above description and from the drawings the effective length of the moment arm 19 can be varied by displacement of shaft 16 in said opening in arm 19. By changing the effective length of said moment arm the torque on the front shaft 8 produced by means of spring 10 can be varied so that the resulting forces transmitted to the seat can be set as desired. This adjustment can be made in view of the weight of the occupant but also in dependence of the nature of the road. Reference numeral 23 designates a bolt passing through a threaded hole in the web of yoke 15 and serving to preset the tension in spring 10. This presetting is preferably carried out in connection with the manufacture of the chair and normally no further adjustment is required.

Reference numeral 24 denotes a shock absorber which is pivotally mounted in a bracket 25 depending from the upper wall of support structure 1. The piston rod 26 projecting from the shock absorber 24 is connected to a U-shaped yoke 27 straddling another arm 28 rigidly mounted on the front shaft 8. Said arm 28 has an oblong opening passed by a shaft which is journalled in the parallel legs of yoke 27. This shaft has double locking cams 29 adapted to engage into recesses 30 in the lengthwise extending parallel edges of said opening in arm 28. For operating the locking cam 29 there is provided an operating member 31 displaceably mounted on one of the legs of yoke 27 and arranged to be brought into engagement with the locking cam 29 to move it into its release position. A spring 32 is arranged between the web of the yoke 27 and the cam 29 to urge the latter towards its locking position. Due to the above arrangement of the shock absorber 24 the resulting force produced thereby to counteract rapid movements of the seat 2 can be set in a simple manner.

Figure 5:
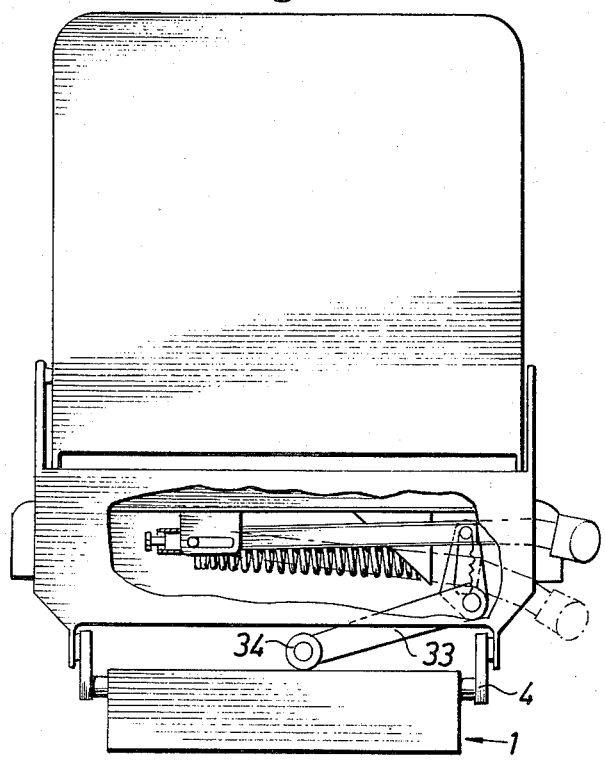
FIG. 5 is a rear view of a chair according to another embodiment of the invention.
Figure 6:
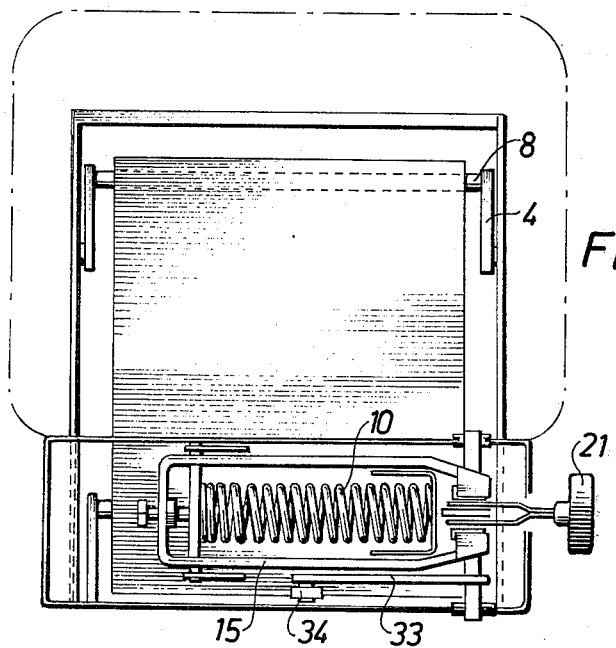
FIG. 6 is a plan view, partly in section, of the chair according to FIG. 5.

In the embodiment according to FIGS. 5–6 the spring device has been placed within the bracket 5 for the back 3. The spring device still has principally the same design as described above. The only essential difference is that the spring device extends in the transverse direction of the seat instead of in its longitudinal direction and that arm 19 is connected to an operating arm 33 having its one end pivotally mounted in the bracket 5 carrying the back 3, and at its opposite end provided with a cam roller 34 contacting a guide surface on the support structure 1. From FIGS. 5 and 6 it will be apparent that the spring device shown in said Figures has the same function as the device illustrated in FIGS. 1–4.

In both cases the coil spring 10 has a pitch varying along the length of the spring. Hereby progressive spring characteristics are obtained permitting a substantial reduction of the dimensions of the spring device and, in addition, a lower amplitude of the vertical movements of the seat.

Figure 7:
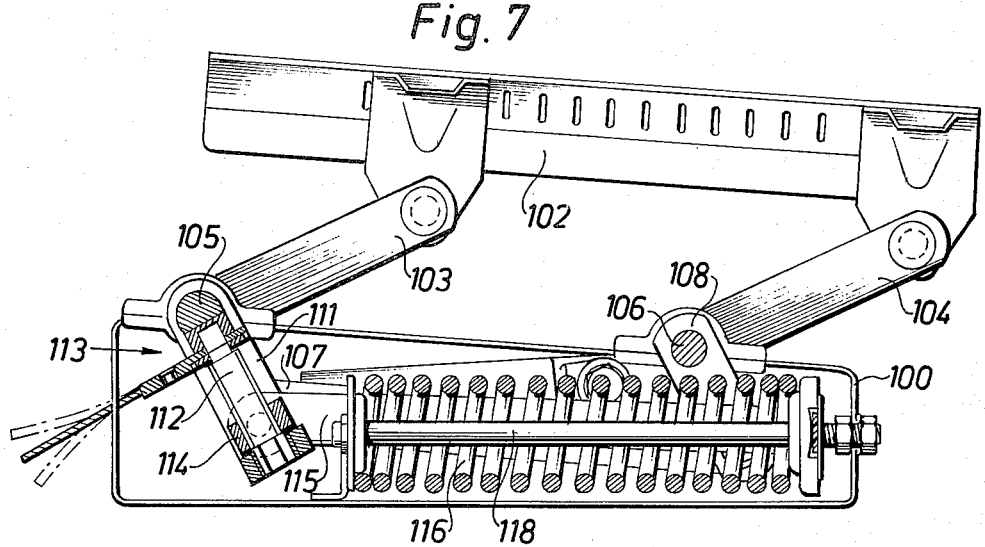
FIG. 7 is a perspective side view showing a chair support structure according to yet another embodiment of the invention.
Figure 8:
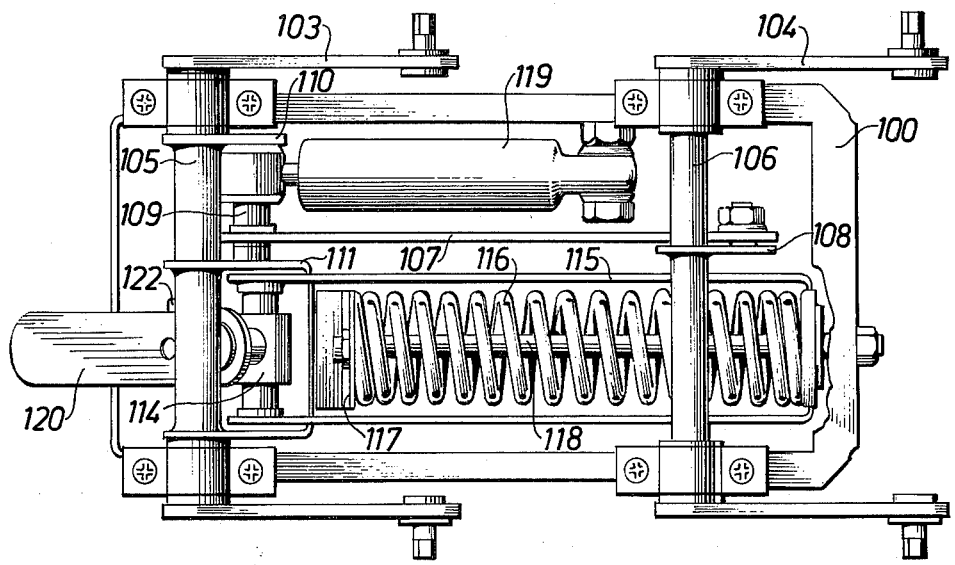
FIG. 8 is a plan view of the support structure according to FIG. 7.
Figure 9:
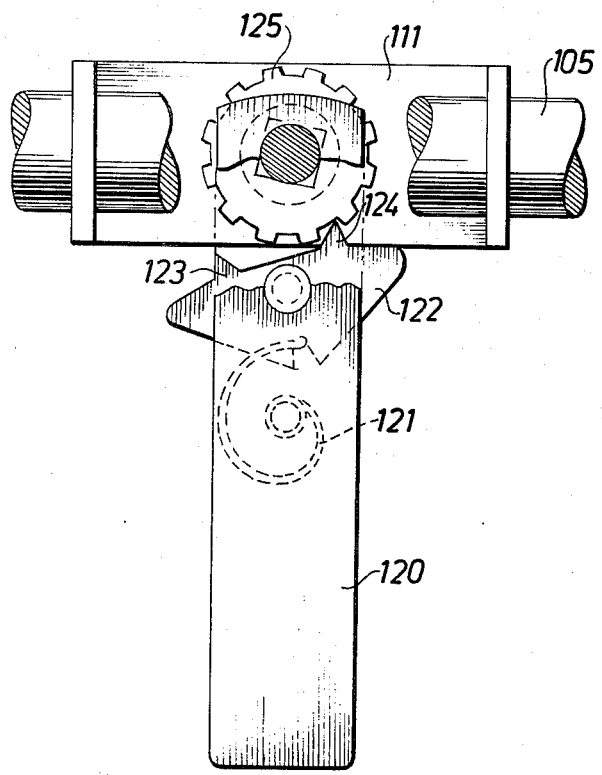
FIG. 9 is a partial view illustrating means for adjusting the spring device of the chair.

In FIGS. 7–9 a boxlike support structure 101 carries a frame 102 by means of one front and one rear pair of support arms 103 and 104, respectively, at one end pivotally connected to frame 102 and at the opposite end secured to a front shaft 105 journalled in support structure 101, and to a rear shaft 106, respectively. The frame 102 is adapted to carry the seat and the back (not shown) of the chair preferably mounted on an upper frame displaceable along frame 102.

A connecting link 107 forms part of a parallelogram mechanism serving to ensure that arms 103 and 104 will always move in unison. At its rear end link 107 is pivotally connected to an arm 108 depending from shaft 106. At its forward end said link is journalled by means of a short shaft 109 extending parallel to shaft 105 from an arm 110 mounted on said shaft to one leg of a yoke 111 rigidly secured to shaft 105.

From FIG. 7 it will be clear that the yoke 111 carries a threaded bolt 112 which is rotatable by means of racket wrench 113. A nut 114 is placed on bolt 112, said nut being pivotally mounted in the outer end portions of two parallel legs of a yoke 115 having a web portion serving as a movable mounting for a compression spring 116 the other end of which bears against a stationary bracket 117. As appears from FIGS. 7 and 8 a rod 118 extends concentrically within spring 116. Said rod has its one end mounted in the support structure 1, while the opposite end is mounted in bracket 117. The web portion of yoke 115 has a boring for rod 118 which forms a guide for the yoke.

As will be apparent from the drawings spring 116 is a coil spring with varying pitch having a maximum pitch at its central portion and a minimum pitch at its ends. Accordingly, the spring is of progressive type, i.e. the spring coefficient will increase successively when the spring is compressed. The spring forces are transmitted to the nut 114 via yoke 115. The influence of said forces on the seat supported by arms 103 and 104 can be adjusted by movement of the nut 114 along the bolt 112. Such a displacement of the nut 114 is accomplished by means of the wrench 113 and involves a change of the length of the moment arm over which the spring force acts on shaft 105.

A shock absorber 119 has one end coupled to the support structure 101 and its opposite end connected to shaft 109. This shock absorber 119 can suitably be of a type offering a substantially greater resistance against upward movement of the frame 102 than against downward movement thereof.

As can be seen from FIG. 9 the wrench 113 comprises an operating arm 120 which is rotatably mounted on bolt 112 and a ratchet 122 pivotally connected to the operating arm 120 and biased by a spring 121. Said ratchet can be swung between two end positions in which one of its two teeth 123 and 124 will engage a toothed wheel 125 mounted in fixed position on bolt 112. As shown in FIG. 9 the non-rotatable connection between the toothed wheel 125 and bolt 112 is obtained by mounting the toothed wheel on a portion of the bolt having a square cross-section.

What is claimed is:

1. A vehicle air comprising in combination:
   a. a seat,
   b. a support structure for the seat,
   c. at least one pair of parallel supporting arms pivotally connected at one end to the seat and at the other end to the support structure, said arms forming opposite parallelogram links,
   d. a pivot arm rigidly secured to one of said supporting arms to move in unison therewith,
   e. spring means interconnecting said pivot arm and said support structure to counteract downward movement of the seat,
   f. means for varying the attack point of said spring means on the pivot arm to permit an adjustment of the effective length of said arm and, hence, an adjustment of the resultant spring forces acting on the seat,
   g. said spring means including at least one helical spring having a winding pitch varying along the length thereof so that said spring means will have a progressive spring coefficient, h. said spring means being connected to said pivot arm by a non-rotatable nut mounted on a threaded bolt extending lengthwise of the pivot arm and arranged upon rotation thereof to cause an axial displacement of the nut.

2. A vehicle chair according to claim 1 wherein a toothed wheel is mounted on said bolt and operable for rotation of the bolt in desired direction by means of a cooperating ratchet wrench.

3. A vehicle chair comprising:
a. a support structure,
b. a chair seat,
c. support arms pivotally connected to said support structure and chair and arranged in a parallelogram mechanism mounting said chair on said support structure,
d. a lever arm coupled to the seat so that the angular position thereof will vary in dependence of the vertical movement of the chair seat,
e. spring means having a resultant progressively increasing spring coefficient counteracting downward movement of the seat, said spring means comprising a single helical spring having a winding pitch varying continuously along the length thereof, whereby the spring coefficient of said spring will vary continuously in response to changes in the length of the spring, said spring being anchored at one end to said support structure; and
f. means connecting the opposite end of said spring to said lever arm adjustably along said lever arm to permit an adjustment of the resultant spring forces transmitted to the seat,
g. said spring means being connected to said lever arm by means of a non-rotatable nut mounted on a threaded bolt extending lengthwise of the lever arm and arranged upon rotation of the bolt to cause an axial displacement of the nut, a toothed wheel mounted on said bolt and ratchet means cooperating with said toothed wheel for rotating the same in a desired direction.

* * * * *